A. REDDING.
STALK PULLER.
APPLICATION FILED NOV. 13, 1909.
953,712.
Patented Apr. 5, 1910.
2 SHEETS—SHEET 1.
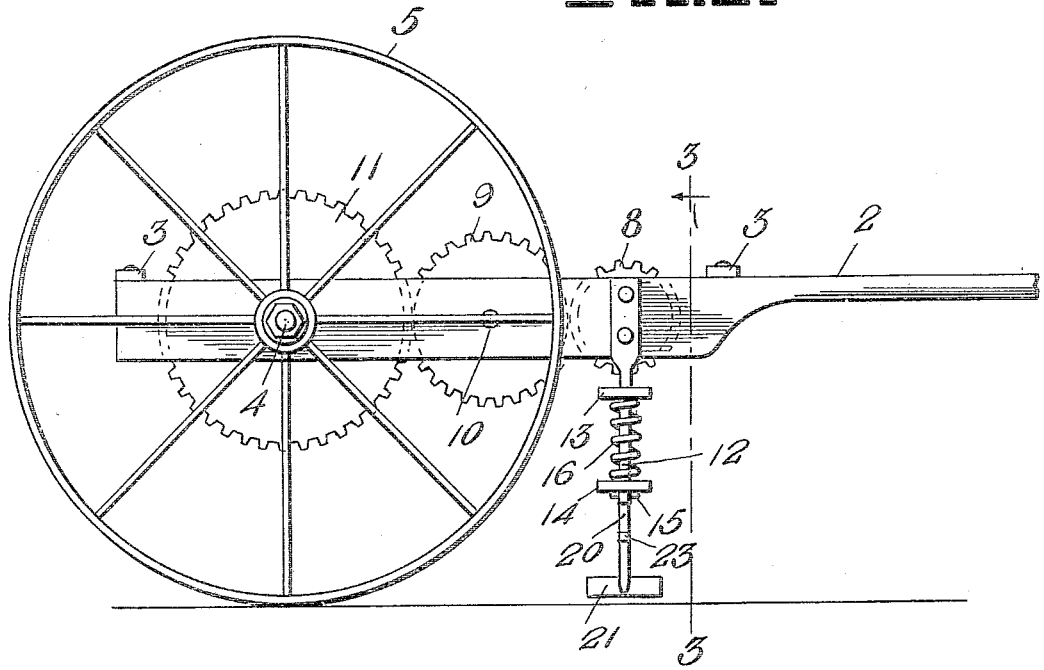
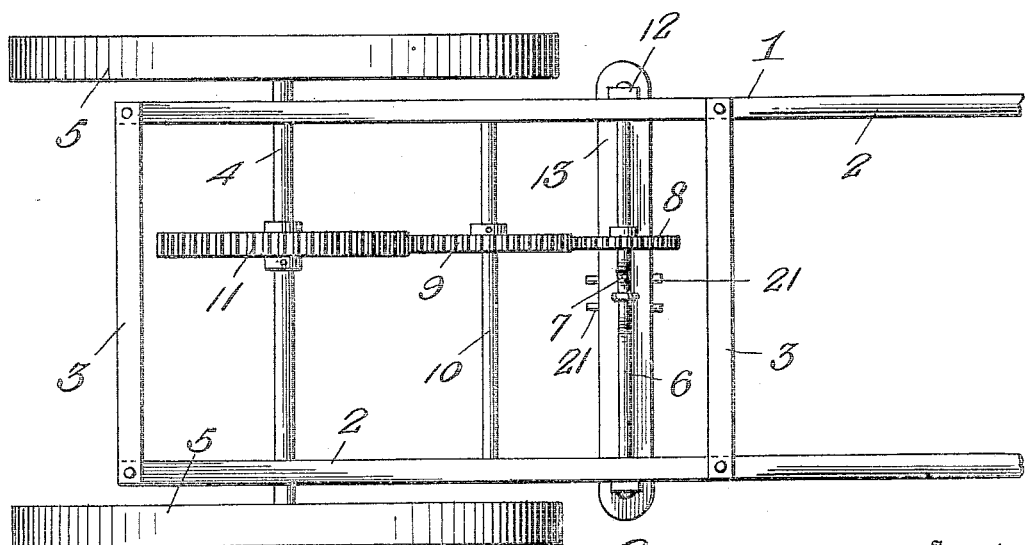

A. REDDING.
STALK PULLER.
APPLICATION FILED NOV. 13, 1909.
953,712.
Patented Apr. 5, 1910.
2 SHEETS—SHEET 2.
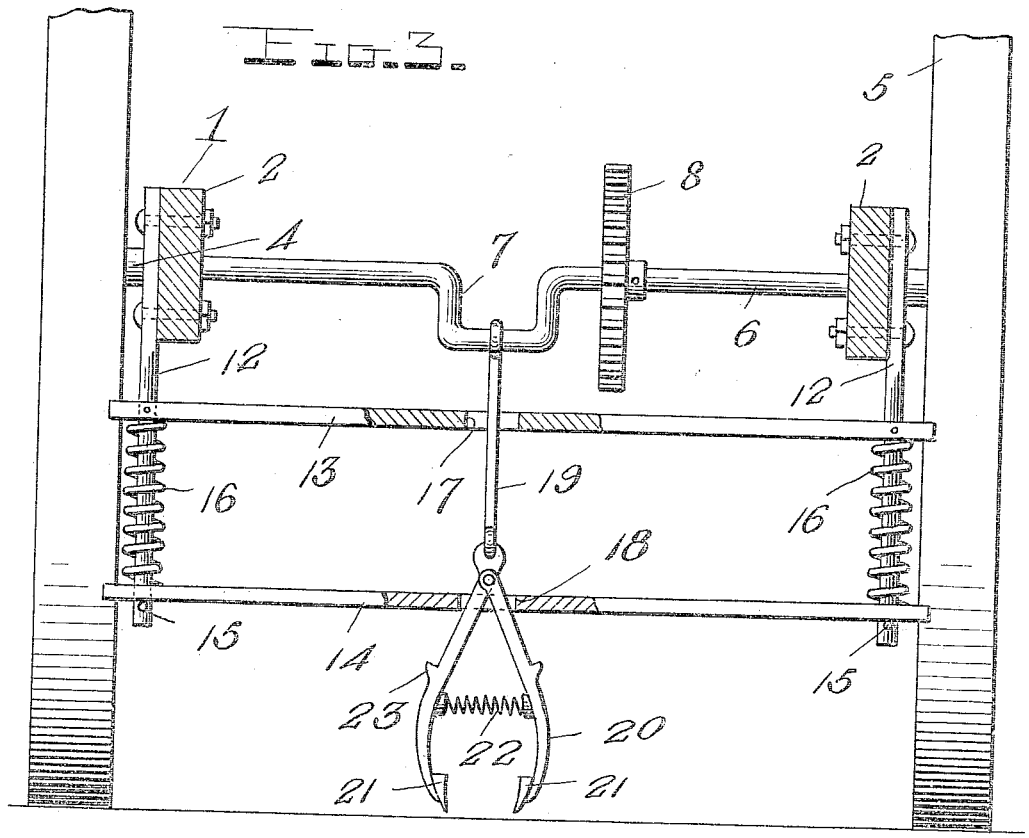
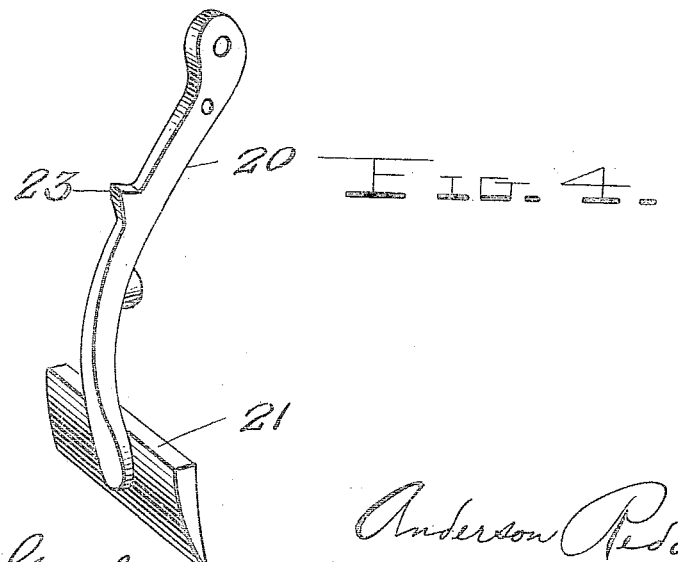

UNITED STATES PATENT OFFICE.

ANDERSON REDDING, OF DAMES FERRY, GEORGIA.

STALK-PULLER.

953,712.     Specification of Letters Patent.     Patented Apr. 5, 1910.

Application filed November 13, 1909. Serial No. 527,930.

*To all whom it may concern:*

Be it known that I, ANDERSON REDDING, a citizen of the United States, residing at Dames Ferry, in the county of Monroe and State of Georgia, have invented certain new and useful Improvements in Stalk-Pullers, of which the following is a specification, reference being had to the accompanying drawings.

This invention relates to improvements in machines for pulling cotton stalks and the like.

The object of the invention is to provide a machine or implement of this character which can be drawn over a row of stalks by draft animals and which will effectively grip and pull the stalks out of the ground and then drop them.

With the above and other objects in view, the invention consists of the novel features of construction and the combination and arrangement of parts hereinafter fully described and claimed, and illustrated in the accompanying drawings, in which—

Figure 1 is a side elevation of the improved stalk pulling machine; Fig. 2 is a top plan view; Fig. 3 is a vertical cross section taken on the line 3—3 in Fig. 1; and Fig. 4 is a detail view of the pulling mechanism.

The invention comprises a suitable frame 1 adapted to be pulled by one or more draft animals and comprising side bars 2 connected by cross bars 3. In the rear portions of the side bars is journaled a rotatable axle 4 having upon its projecting extremities supporting and drive wheels 5.

Journaled in the forward portion of the frame 1 between the side bars is a transverse shaft 6 provided with a crank 7 and having fixed to it a pinion 8. The latter meshes with a larger pinion or gear 9 on a transverse countershaft 10 and said gear 9 in turn meshes with a larger gear 11 fixed to the rotary axle 4. The gears 8, 9, 11 form a chain of multiplying gears by means of which the crank shaft 6 is rapidly rotated from the rear axle 4.

Depending from the forward portions of the side bars 2 are supporting and guide bars 12 rigidly united at a point intermediate their ends by a horizontal cross bar 13. Slidably arranged upon the lower ends of the bars or arms 12 is a movable cross bar 14 which is pressed downwardly against stops 15 on the bars 12, by means of coil springs 16 which surround the bars 12 and are confined between the bars 13, 14, as clearly shown in Fig. 3 of the drawings.

Formed in the bars 13, 14 are vertical openings 17, 18 which receive a pitman 19 and a pair of stalk pulling levers 20. Said levers have, at their lower ends, longitudinally extending and opposed stalk gripping jaws 21 and their upper ends which converge are pivotally united to the lower end of the pitman, the upper end of which latter is engaged with the crank 7. A coil spring 22 is arranged between the jaw levers 20 for the purpose of forcing their lower ends apart, the strength of said spring 22 being less than the strength of the spring 16, whereby when the crank 7 draws the pitman 19 upwardly, the levers 20 will be drawn upwardly through the opening 18 in the cross bar 14, and, owing to the size of said opening, said levers will have their lower ends or jaws 21 swung toward each other to grip the stalks between them. Stops 23 are provided upon the intermediate portions of the levers 20 for limiting their upward movement through the opening 18 in the cross bar 14, and the proportions of these parts are such that when the stops 23 engage the cross bar 14, the jaws 21 effectively grip the stalks between them. The continued upward movement of the pitman 19 will cause the cross bar 14 to be lifted with the jaws 20 owing to the engagement of the stops 23 with said cross bar and such continued upward movement of the levers 20 will cause the stalks held between their jaws 21 to be pulled out of the ground. As the pitman 19 is lowered the springs 16 return the cross bar 14 to its normal position before the levers 20 are separated by the spring 22, but the continued downward movement of the pitman 19 forces said levers through the opening 18 in the cross bar 14, whereupon, the spring 22 opens or separates the jaws 21 and permits the stalks between them to drop to the ground.

In operation, it will be seen that when the machine or implement is drawn over a row of stalks by the draft animal or animals, the wheels 5 will rotate the axle 4 and the motion of the latter will be imparted through the gears 11, 9, 8 to the crank shaft 6. The latter will be continuously rotated so that its crank 7 will raise and lower the pitman 19 and, consequently, raise and lower the jaw levers 20. As said levers are moved up and down they will be successively closed and opened, as explained above, so that they will effectively pull the stalks out of the ground and then drop them.

Having thus described the invention what is claimed is:

1. In a machine of the character described, a wheeled support, a vertically reciprocating element driven from the wheels of said support, a pair of pivotally mounted levers actuated by said element and having gripping jaws at their lower ends, a spring pressed, vertically movable guide having an opening to receive the converging upper ends of said levers, said guide being adapted to move the jaws of said levers together when the latter are elevated and to move upwardly with the levers when their jaws engage the stalks and means for separating the jaws of the levers when the latter are moved downwardly through said guides.

2. In a machine of the character described, a wheeled support, a vertically reciprocating element driven from the wheels of said support, a pair of pivotally mounted levers actuated by said element and having gripping jaws at their lower ends, a spring pressed guide mounted for vertical movement and having an opening to receive the converging upper ends of said levers, stops upon said levers to engage the guide and cause the latter to move upwardly with the levers, and a spring for forcing the levers apart when they are moved downwardly through the guide.

3. A machine of the character described comprising a frame, a rotatable axle thereon, supporting and drive wheels on said axle, a crank shaft, means for imparting the motion of the axle to said crank shaft, depending guide bars, a vertically slidable cross bar on said guide bars and having an opening, springs for forcing said cross bar downwardly, a pair of levers having gripping jaws at their lower ends, a pitman connected to the crank of said crank shaft and having its lower end pivoted to the converging upper ends of said levers, stops upon said levers to engage said cross bar, and a coil spring arranged between said levers for forcing their jaws apart.

In testimony whereof I hereunto affix my signature in the presence of two witnesses.

ANDERSON REDDING.

Witnesses:
JULIAN J. WILLINGHAM,
B. S. WILLINGHAM.